US012630092B1

(12) United States Patent
Zhang et al.

(10) Patent No.: US 12,630,092 B1
(45) Date of Patent: May 19, 2026

(54) CONNECTING ROD ASSEMBLY, PEDAL APPARATUS AND VEHICLE

(71) Applicant: Zhongshan AOD Electronics Technology Co., Ltd., Zhongshan (CN)

(72) Inventors: Jingyu Zhang, Zhongshan (CN); Yusheng Chen, Zhongshan (CN); Xuanmo Guo, Zhongshan (CN)

(73) Assignee: Zhongshan AOD Electronics Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/014,127

(22) Filed: Jan. 8, 2025

(30) Foreign Application Priority Data

Nov. 18, 2024 (CN) .......................... 202411647670.2

(51) Int. Cl.
B60R 3/02 (2006.01)
(52) U.S. Cl.
CPC ..................................... B60R 3/02 (2013.01)
(58) Field of Classification Search
CPC ....................................................... B60R 3/02
See application file for complete search history.

(56) References Cited

U.S. PATENT DOCUMENTS

| | | | | | |
|---|---|---|---|---|---|
| 4,110,673 | A * | 8/1978 | Magy | ................... | H02H 7/0851 |
| | | | | | 280/166 |
| 7,455,342 | B2 * | 11/2008 | Lechkun | ................ | B60N 2/995 |
| | | | | | 296/64 |
| 2008/0054586 | A1 * | 3/2008 | Lechkun | ................... | B60R 3/02 |
| | | | | | 280/166 |

| | | | | |
|---|---|---|---|---|
| 2022/0332254 | A1 | 10/2022 | Smith | |
| 2024/0399963 | A1 * | 12/2024 | Wong | ...................... B60R 3/002 |
| 2025/0303968 | A1 * | 10/2025 | Cho | ........................... B60R 3/02 |

FOREIGN PATENT DOCUMENTS

| | | | |
|---|---|---|---|
| CN | 108583446 A | 9/2018 | |
| CN | 110027476 A * | 7/2019 | ............. B60R 3/007 |
| CN | 114407785 A | 4/2022 | |
| CN | 114619966 A | 6/2022 | |
| CN | 216761626 U | 6/2022 | |
| CN | 216761627 U | 6/2022 | |
| CN | 216915698 U | 7/2022 | |
| CN | 218141292 U | 12/2022 | |
| CN | 116985714 A | 11/2023 | |
| EP | 0418615 A1 * | 3/1991 | ............... B60R 3/02 |

OTHER PUBLICATIONS

EP-0418615-A1 English Translation (Year: 1991).*
CN-110027476-A English Translation (Year: 2019).*

* cited by examiner

*Primary Examiner* — Michael T. Walsh
(74) *Attorney, Agent, or Firm* — Ming Jiang; OPENPTO US LLC

(57) ABSTRACT

Disclosed are a connecting rod assembly, a pedal apparatus and a vehicle. The assembly includes a mounting base, a moving base located below the mounting base, a first swing arm, a second swing arm, a support arm and a linkage arm. The first swing arm is hinged respectively to the mounting base at a first hinge point and the moving base at a second hinge point at both ends. The second swing arm is hinged respectively to the mounting base at a third hinge point and the moving base at a fourth hinge point at both ends. The support arm is hinged to the moving base at a fifth hinge point. The linkage arm is hinged respectively to the second swing arm at a sixth hinge point and the support arm at a seventh hinge point at both ends, and the linkage arm can drive the support arm to flip.

20 Claims, 5 Drawing Sheets

100

100

CONNECTING ROD ASSEMBLY, PEDAL APPARATUS AND VEHICLE

CROSS-REFERENCE TO RELATED APPLICATIONS

This application is based on and claims the benefit of priority from Chinese Patent Application No. 2024116476702, filed on Nov. 18, 2024, the entirety of which is incorporated by reference herein.

TECHNICAL FIELD

The present disclosure relates to the field of automotive accessories, and in particular, to a connecting rod assembly, a pedal apparatus and a vehicle.

BACKGROUND

A four-link electric pedal apparatus is widely used in many vehicle types with high chassis due to their high reliability and excellent load-bearing capacity to assist drivers and passengers to enter and exit the cabin conveniently. However, for new energy sport-utility vehicles (SUV), since the battery pack mounted on the chassis is closer to the side beams of the vehicle, the mounting space of the electric pedal apparatus is very limited, which makes it difficult for the electric pedal apparatus mounted on the new energy vehicle to have sufficient extension length and retraction concealment.

SUMMARY

The present disclosure provides a connecting rod assembly, a pedal apparatus and a vehicle, which can solve the technical problem in the existing technologies that the electric pedal apparatus mounted on the new energy vehicle is difficult to achieve both sufficient extension length and retraction concealment.

In order to solve the above technical problems, a technical solution used by the present disclosure is as follows. A connecting rod assembly is provided. The connecting rod assembly includes a mounting base; a moving base, the moving base being located below the mounting base along a first direction; a first swing arm, a first end of the first swing arm being hingedly connected to the mounting base at a first hinge point, and a second end of the first swing arm being hingedly connected to the moving base at a second hinge point; a second swing arm, a first end of the second swing arm being hingedly connected to the mounting base at a third hinge point, and a second end of the second swing arm being hingedly connected to the moving base at a fourth hinge point, where at least one of the first swing arm and the second swing arm can drive the moving base to extend and retract relative to the mounting base along a second direction; a support arm, the support arm being hingedly connected to the moving base at a fifth hinge point, and the fourth hinge point being located between the fifth hinge point and the second hinge point; and a linkage arm, a first end of the linkage arm being hingedly connected to a third end of the second swing arm at a sixth hinge point, and a second end of the linkage arm being hingedly connected to the support arm at a seventh hinge point, where the linkage arm can drive the support arm to flip around the fifth hinge point.

In some embodiments, a distance between the first hinge point and the second hinge point is a first center distance, a distance between the third hinge point and the fourth hinge point is a second center distance, and the first center distance is smaller than the second center distance; when the moving base is in an extended state or a retracted state, an included angle of 0° to 3° is allowed to be formed between a connecting line and a horizontal plane, and the connecting line is between the second hinge point and the fourth hinge point.

In some embodiments, a difference between the second center distance and the first center distance is greater than or equal to 6 mm and less than or equal to 12 mm.

In some embodiments, the sixth hinge point is farther away from the second hinge point relative to the fourth hinge point and the seventh hinge point is more proximate to the second hinge point relative to the fifth hinge point along the second direction, and the seventh hinge point is located above the fifth hinge point along the first direction.

In some embodiments, when the moving base is in a retracted state, a connecting line between the sixth hinge point and the seventh hinge point and the connecting line between the sixth hinge point and the third hinge point form a first included angle, the first included angle is an acute angle, and the size of the first included angle is greater than or equal to 0° and less than or equal to 10°.

In some embodiments, when the moving base is in a retracted state, the fourth hinge point, the seventh hinge point, the sixth hinge point and the fifth hinge point constitute four corner points of a first quadrilateral; in the first quadrilateral, the fourth hinge point and the seventh hinge point are located above the sixth hinge point and the fifth hinge point along the first direction, and the fourth hinge point is diagonally opposite to the fifth hinge point, and in the second direction, the fourth hinge point is more proximate to the second hinge point relative to the seventh hinge point.

In some embodiments, when the moving base is in a retracted state, a connecting line between the fourth hinge point and the seventh hinge point and a connecting line between the sixth hinge point and the fifth hinge point form a second included angle, and the size of the second included angle is greater than or equal to 0° and less than or equal to 10°. Additionally or alternatively, when the moving base is in a retracted state, a connecting line between the fourth hinge point and the sixth hinge point and a connecting line between the seventh hinge point and the fifth hinge point form a third included angle, and the size of the third included angle is greater than or equal to 0° and less than or equal to 5°.

In some embodiments, when the moving base is in an extended state, the sixth hinge point, the seventh hinge point, the fourth hinge point, and the fifth hinge point constitute four corner points of a second quadrilateral; in the second quadrilateral, the sixth hinge point and the seventh hinge point are located above the fourth hinge point and the fifth hinge point along the first direction, and the sixth hinge point is diagonally opposite to the fifth hinge point, and in the second direction, the sixth hinge point is more proximate to the second hinge point relative to the seventh hinge point.

In some embodiments, when the moving base is in an extended state, a connecting line between the sixth hinge point and the seventh hinge point and a connecting line between the fourth hinge point and the fifth hinge point form a fourth included angle, and the size of the fourth included angle is greater than or equal to 0° and less than or equal to 5°. Additionally or alternatively, when the moving base is in an extended state, a connecting line between the sixth hinge point and the fourth hinge point and a connecting line between the seventh hinge point and the fifth hinge point form a fifth included angle, and the size of the fifth included angle is greater than or equal to 45° and less than or equal to 55°.

In some embodiments, the second swing arm includes a first connecting portion, a main body portion and a second connecting portion, the main body portion is connected between the first connecting portion and the second connecting portion, a first end of the first connecting portion opposite the main body portion is hingedly connected to the mounting base at the third hinge point, a first end of the main body portion opposite the first connecting portion is hingedly connected to the moving base at the fourth hinge point, and a first end of the second connecting portion opposite the main body portion is hingedly connected to the linkage arm at the sixth hinge point.

In some embodiments, the second swing arm defines a receiving groove, and the linkage arm is configured to be received in the receiving groove when the moving base is in a retracted state.

In some embodiments, the support arm includes a third connecting portion and a supporting portion connected to each other, a first end of the third connecting portion opposite the supporting portion is hingedly connected to the linkage arm at the seventh hinge point, and a second end of the third connecting portion proximate to the supporting portion is hingedly connected to the moving base at the fifth hinge point.

In some embodiments, the moving base includes a first molded base plate, a second molded base plate and two side plates, the first molded base plate and the second molded base plate are arranged between the two side plates at intervals, the side plates are hingedly connected at one of their respective ends to the first swing arm at the second hinge point, the side plates are hingedly connected at the other of their respective ends to the support arm at the fifth hinge point, a structure between the two ends of the side plates is hingedly connected to the second swing arm at the fourth hinge point, and a space enclosed by the two side plates, the first molded base plate and the second molded base plate can accommodate part of the structure of the first swing arm, part of the structure of the support arm and part of the structure of the second swing arm.

In some embodiments, when the moving base is in an extended state, a connecting line between the fifth hinge point and the fourth hinge point and a connecting line between the fifth hinge point and the third hinge point form a sixth included angle, the sixth included angle is an acute angle, and the size of the sixth included angle is greater than or equal to 0° and less than or equal to 10°.

In some embodiments, the second swing arm is in a Z-shape as a whole, and the support arm is in an L-shape as a whole.

In some embodiments, the support arm can flip around the fifth hinge point at an angle greater than or equal to 20° and less than or equal to 35°.

Another technical solution used in present disclosure is as follows. A pedal apparatus is provided. The pedal apparatus includes: a connecting rod assembly; a driving device configured to drive the first swing arm and/or the second swing arm of the connecting rod assembly; and a pedal body fixed to the support arm of the connecting rod assembly, where, driven by the driving device, the pedal body can be extended and flipped relative to the mounting base of the connecting rod assembly, and where the connecting rod assembly is the connecting rod assembly described above.

In some embodiments, the pedal apparatus includes several the connecting rod assemblies, and the several connecting rod assemblies are arranged along the length direction of the pedal body.

In some embodiments, when the mounting base is fixed to a chassis of the vehicle, the included angle between the pedal surface of the pedal body and the horizontal plane is greater than or equal to 0° and less than or equal to 5° when the moving base of the connecting rod assembly is in an extended state, and the included angle between the pedal surface of the pedal body and the horizontal plane is greater than or equal to 20° and less than or equal to 40° when the moving base of the connecting rod assembly is in a retracted state.

Still another technical solution used in present disclosure is as follows. A vehicle is provided. The vehicle includes the pedal apparatus described above, the mounting base in the pedal apparatus is fixed to the chassis of the vehicle, and when the moving base in the pedal apparatus is in an extended state, a first gap distance exists between the pedal body in the pedal apparatus and the side skirt of the vehicle along the first direction, a second gap distance exists between the pedal body in the pedal apparatus and the side skirt of the vehicle along the second direction; and when the moving base in the pedal apparatus is in a retracted state, the pedal body fits the side skirt of the vehicle.

The present disclosure achieves the following beneficial effects. The connecting rod assembly provided by the present disclosure, different from the existing technologies, includes a mounting base; a moving base, the moving base being located below the mounting base along a first direction; a first swing arm, a first end of the first swing arm being hingedly connected to the mounting base at a first hinge point, and a second end of the first swing arm being hingedly connected to the base at a second hinge point; a second swing arm, a first end of the second swing arm moving being hingedly connected to the mounting base at a third hinge point, and a second end of the second swing arm being hingedly connected to the moving base at a fourth hinge point, where at least one of the first swing arm and the second swing arm can drive the moving base to extend and retract relative to the mounting base along a second direction; a support arm, the support arm being hingedly connected to the moving base at a fifth hinge point, and the fourth hinge point being located between the fifth hinge point and the second hinge point; and a linkage arm, a first end of the linkage arm being hingedly connected to a third end of the second swing arm at a sixth hinge point, and a second end of the linkage arm being hingedly connected to the support arm at a seventh hinge point, where the linkage arm can drive the support arm to flip around the fifth hinge point. According to the technical solutions of the present disclosure, when the moving base is extending relative to the mounting base, the support arm flips outwards as the moving base is extended, so that the pedal body fixed to the support arm has a sufficient extension length; when the moving base is retracting relative to the mounting base, the support arm flips inward as the moving base is retracted, so that the pedal body fixed to the support arm can fit the vehicle skirt. In this way, the connecting rod assembly can enable the pedal apparatus mounted on the new energy vehicle to have a sufficient extension length while ensuring the retraction concealment.

BRIEF DESCRIPTION OF DRAWINGS

In order to illustrate the technical solutions in the embodiments of the present disclosure more clearly, the accompanying drawings used in the embodiments will be briefly described below. Apparently, the accompanying drawings in the following description illustrate only a part of embodiments of the present disclosure, and for persons of ordinary skill in the art, other drawings can be obtained based on these accompanying drawings without creative efforts.

Figure 1:
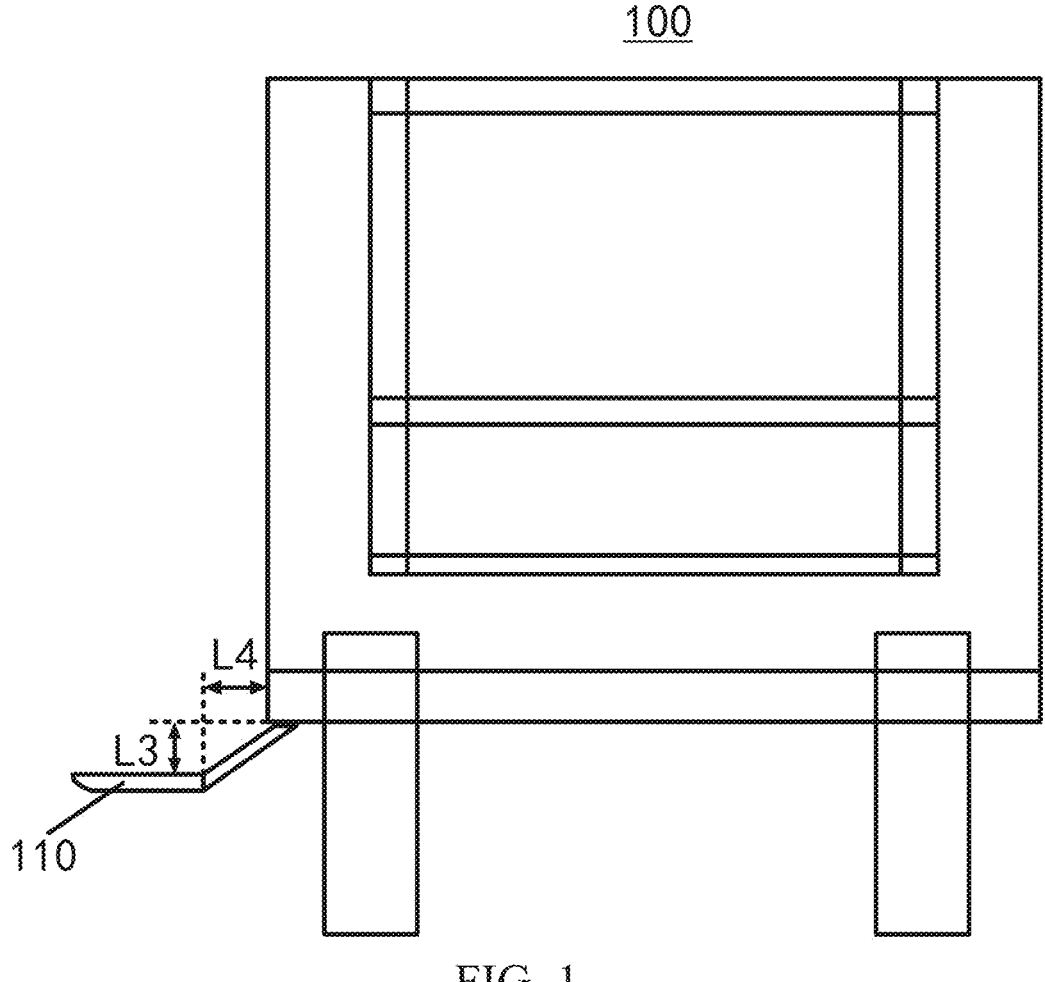
FIG. 1 is a structural schematic diagram of a vehicle when a pedal apparatus is in an extended state according to some embodiments of the present disclosure.

REFERENCE NUMERALS vehicle 100, pedal apparatus 110, connecting rod assembly 111, driving device 112, pedal body 13, mounting base 1111, moving base 1112, first molded base plate 1112*a*, second molded base plate 1112*b*, side plate 1112*c*, first swing arm 1113, second swing arm 1114, first connecting portion 1114*a*, main body portion 1114*b*, second connecting portion 1114*c*, receiving groove 1114*d*, support arm 1115, third connecting portion 1115*a*, supporting portion 1115*b*, linkage arm 1116, first hinge point D1, second hinge point D2, third hinge point D3, fourth hinge point D4, fifth hinge point D5, sixth hinge point D6, seventh hinge point D7, first center distance L1, second center distance L2, first included angle $\alpha$, second included angle $\beta$, third included angle $\gamma$, fourth included angle $\theta$, fifth included angle $\delta$, sixth included angle g, first quadrilateral Q1, second quadrilateral Q2, first gap distance L3, second gap distance L4, and pedal surface M.

DETAILED DESCRIPTION

The technical solutions in the embodiments of the present disclosure will be clearly and completely described below in conjunction with the accompanying drawings in the embodiments of the present disclosure. It can be understood that the specific embodiments described herein are only used to explain the present disclosure, but not to limit the present disclosure. Furthermore, it should be noted that, for ease of description, only some but not all structures related to the present disclosure are shown in the drawings. All other embodiments obtained by persons of ordinary skill in the art based on the embodiments of the present disclosure without creative efforts shall fall within the protection scope of the present disclosure.

The terms "first", "second" and "third" in the present disclosure are only used for descriptive purposes and cannot be understood as indicating or implying relative importance or implicitly indicating the number of indicated technical features. Thus, features defined as "first", "second" and "third" may explicitly or implicitly include at least one of these features. In the description of the present disclosure, "several/the plurality of" means at least two, for example two, three, and/or the like, unless otherwise clearly and specifically defined. All directional indications (such as up, down, left, right, front, back . . . ) in the embodiments of the present disclosure are only used to explain the relative positional relationship, movement, and/or the like between the components in a specific posture (as shown in the drawings). If the specific posture changes, the directional indication will also change accordingly. Furthermore, the terms "comprise/include" and "have/has" and any variations thereof are intended to cover non-exclusive inclusion. For example, a process, method, system, product or device that includes a series of steps or units is not limited to the listed steps or units, but optionally also includes steps or units that are not listed, or optionally also includes other steps or units inherent to such processes, methods, products or devices.

Reference to "embodiment/embodiments" herein means that the specific features, structures or characteristics described in conjunction with the embodiment may be included in at least one embodiment of the present disclosure. The phrase described in different places in the specification does not necessarily refer to the same embodiment nor an independent or alternative embodiment that is mutually exclusive with other embodiments. Those skilled in the art understand, both explicitly and implicitly, that the embodiments described herein may be combined with other embodiments.

In the present disclosure, the first direction refers to the direction of the Z axis, the second direction refers to the direction of the Y axis, the upper direction refers to the direction indicated by the positive direction of the Z axis, the lower direction refers to the direction indicated by the negative direction of the Z axis, the "outward" refers to the direction indicated by the positive direction of the Y axis, and the "inward" refers to the direction indicated by the negative direction of the Y axis.

The connecting rod assembly provided in the present disclosure includes: a mounting base; a moving base, the moving base being located below the mounting base along a first direction; a first swing arm, a first end of the first swing arm being hingedly connected to the mounting base at a end of the first swing arm being hingedly connected to the first hinge point, and a second base at a second hinge point; a second swing arm, one end of the second swing arm being moving hingedly connected to the mounting base at a third hinge point, and a second end of the second swing arm being hingedly connected to the moving base at a fourth hinge point; wherein, along a second direction, at least one of the first swing arm and the second swing arm can drive the moving base to extend and retract relative to the mounting base; a support arm, the support arm being hingedly connected to the moving base at a fifth hinge point, and the fourth hinge point being located between the fifth hinge point and the second hinge point; a linkage arm, a first end of the linkage arm being hingedly connected to a third end of the second swing arm at a sixth hinge point, and a second end of the linkage arm being hingedly connected to the support arm at a seventh hinge point. The linkage arm can drive the support arm to flip around the fifth hinge point. According to the technical solutions of the present disclosure, when the moving base is extending relative to the mounting base, the support arm flips outwards as the moving base is extended, so that the pedal body fixed to the support arm has a sufficient extension length; when the moving base is retracting relative to the mounting base, the support arm flips inward as the moving base is retracted, so that the pedal body fixed to the support arm can fit the vehicle skirt. In this way, the connecting rod assembly can enable the pedal apparatus mounted on the new energy vehicle to have a sufficient extension length while ensuring the retraction concealment.

Figure 2:
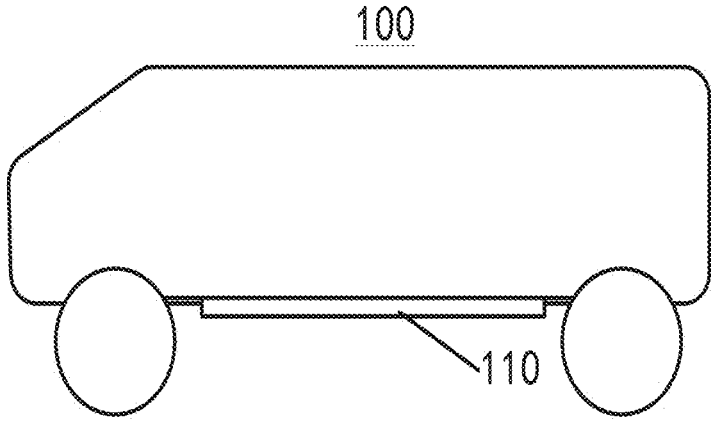
FIG. 2 is a structural schematic diagram of a vehicle when a pedal apparatus is in a retracted state according to some embodiments of the present disclosure.

FIG. 1 is a structural schematic diagram of a vehicle when a pedal apparatus is in an extended state according to some embodiments of the present disclosure; FIG. 2 is a structural schematic diagram of a vehicle when a pedal apparatus is in a retracted state according to some embodiments of the present disclosure. Referring to FIG. 1 and FIG. 2 in conjunction, the vehicle 100 provided in the present disclosure may include but is not limited to a pedal apparatus 110. When the pedal apparatus 110 is in an extended state (at this time, the moving base 1112 in the pedal apparatus 110 is in an extended state), a first gap distance L3 exists between the pedal body 113 in the pedal apparatus 110 and the side skirt of the vehicle 100 along the first direction, and a second gap distance L4 exists between the pedal body 113 in the pedal apparatus 110 and the side skirt of the vehicle 100 along the second direction, so as to form a stepped structure, thereby reducing the ground clearance of the vehicle 100, and facilitating users to get on and off the vehicle. When the pedal apparatus 110 is in a retracted state (at this time, the moving base 1112 in the pedal apparatus 110 is in a retracted state), the pedal body 113 in the pedal apparatus 110 fits the side skirt of the vehicle 100 to keep the appearance of the vehicle 100 clean and smooth while not affecting the passability of the vehicle 100.

The size of the first gap distance L3 is greater than or equal to 100 mm and less than or equal to 200 mm, so that the driver and passengers have sufficient foothold when stepping on the pedal body 113 in the pedal apparatus 110, thereby improving the users' comfort and satisfaction. Specifically, the size of the first gap distance L3 may be 100 mm, 120 mm, 125 mm, 130 mm, 150 mm, 160 mm, 175 mm or 200 mm, or the like. In this example, the size of the first gap distance L3 is 126.28 mm. The size of the second gap distance L4 is greater than or equal to 100 mm and less than or equal to 150 mm, so that the ground clearance of the vehicle 100 can be effectively reduced when the pedal apparatus 110 is in an extended state, thereby facilitating different users to enter and exit the vehicle cabin, and improving the friendliness to users with short stature. Specifically, the size of the second gap distance L4 may be 100 mm, 105 mm, 110 mm, 120 mm, 125 mm, 130 mm, 140 mm or 150 mm, or the like. In this example, the size of the second gap distance L4 is 137 mm.

Figure 3:
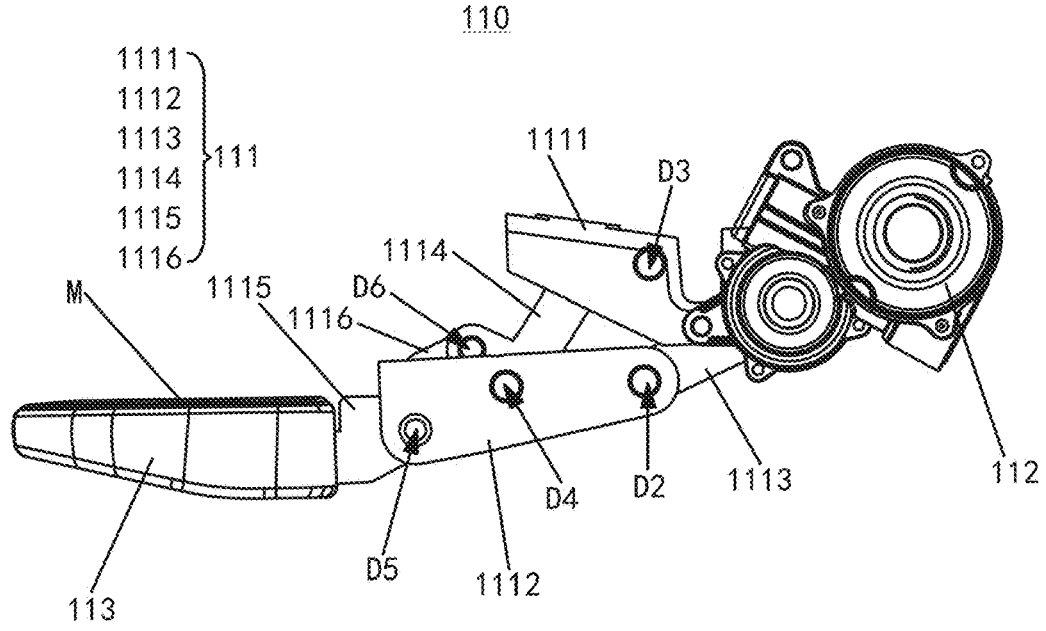
FIG. 3 is a structural schematic diagram of a pedal apparatus in an extended state according to some embodiments of the present disclosure.
Figure 4:
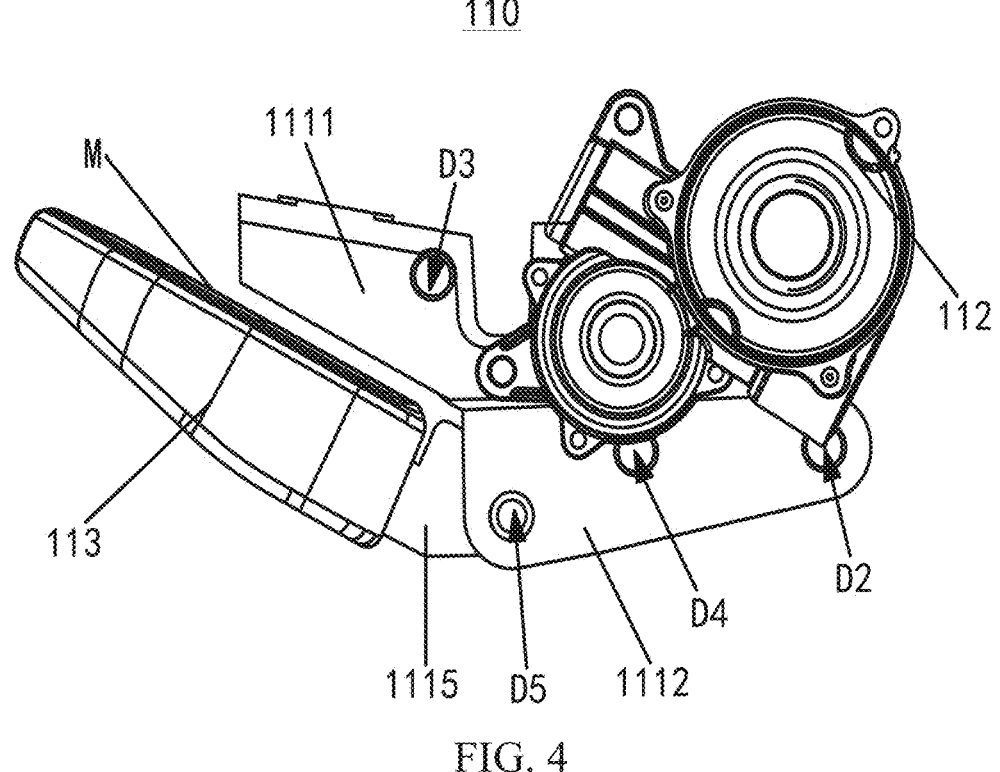
FIG. 4 is a structural schematic diagram of a pedal apparatus in a retracted state according to some embodiments of the present disclosure.

FIG. 3 is a structural schematic diagram of a pedal apparatus in an extended state according to some embodiments of the present disclosure; FIG. 4 is a structural schematic diagram of a pedal apparatus in a retracted state according to some embodiments of the present disclosure. Please refer to FIG. 1 to FIG. 4 in conjunction, the pedal apparatus 110 provided in the present disclosure may include but is not limited to a connecting rod assembly 111, a driving device 112 and a pedal body 113. Specifically, the driving device 112 is configured to drive the first swing arm

1113 and/or the second swing arm 1114 of the connecting rod assembly 111. The pedal body 113 is fixed to the support arm 1115 of the connecting rod assembly 111. Driven by the driving device 112, the pedal body 113 can be extended and flipped relative to the mounting base 1111 of the connecting rod assembly 111.

Further, the pedal apparatus 110 includes several connecting rod assemblies 111. When a plurality of connecting rod assemblies 111 are provided, the plurality of connecting rod assemblies 111 are arranged along the length direction of the pedal body 113. In this embodiment, the pedal apparatus 110 includes two connecting rod assemblies 111, and the two connecting rod assemblies 111 are arranged along the length direction of the pedal body 113, and the pedal apparatus 110 is mounted on both sides of the vehicle 100. In this embodiment, increasing the number of connecting rod assemblies 111, for example, increasing to three or more, can effectively increase the load-bearing capacity of the pedal apparatus 110 and improve the smoothness of the movement of the pedal apparatus 110. In some other embodiments, the pedal apparatus 110 includes one connecting rod assembly 111; along the length direction of the pedal body 113, the connecting rod assembly 111 is arranged at the middle position of the pedal body 113, and the pedal apparatus 110 is mounted at the position corresponding to the door, such as, stern door, front left door, front right door, rear left door and rear right door, and/or the like.

Furthermore, the mounting base 1111 of the connecting rod assembly 111 is fixed to a chassis of the vehicle 100. The included angle between the pedal surface M of the pedal body 113 and the horizontal plane is greater than or equal to 0° and less than or equal to 5° if the moving base 1112 of the connecting rod assembly 111 is in an extended state, so as to prevent users from slipping outward easily when stepping on the pedal surface M. Specifically, the included angle between the pedal surface M of the pedal body 113 and the horizontal plane may be 0°, 1°, 1.7°, 2°, 2.5°, 3°, 3.7°, 4°, 4.5°, 5°, or the like. In this embodiment, when the moving base 1112 is in the extended state, the included angle between the pedal surface M of the pedal body 113 and the horizontal plane is 1.14°. If the moving base 1112 of the connecting rod assembly 111 is in a retracted state, the included angle between the pedal surface M of the pedal body 113 and the horizontal plane is greater than or equal to 20° and less than or equal to 40°, so as to better fit the vehicle skirt, thereby improving the retraction concealment, overall aesthetics and passability. Specifically, the included angle between the pedal surface M of the pedal body 113 and the horizontal plane may be 20°, 23°, 25°, 27.5°, 28°, 30°, 33°, 35°, 37.5° and 40°, or the like. In this embodiment, when the moving base 1112 is in the retracted state, the included angle between the pedal surface M of the pedal body 113 and the horizontal plane is 27.39°.

Alternatively, the driving device 112 may be an electric motor. In this embodiment, the driving device 112 is drivingly connected to the first swing arm 1113 to drive the first swing arm 1113, and then drive the moving base 1112 to extend or retract relative to the mounting base 1111 with the assistance of the second swing arm 1114. In this embodiment, when the pedal apparatus 110 is in an extended state (at this time, the moving base 1112 is in an extended state), the pedaling load borne by the pedal body 113 is difficult to transmit to the driving device 112, thereby protecting the driving device 112.

Figure 5:
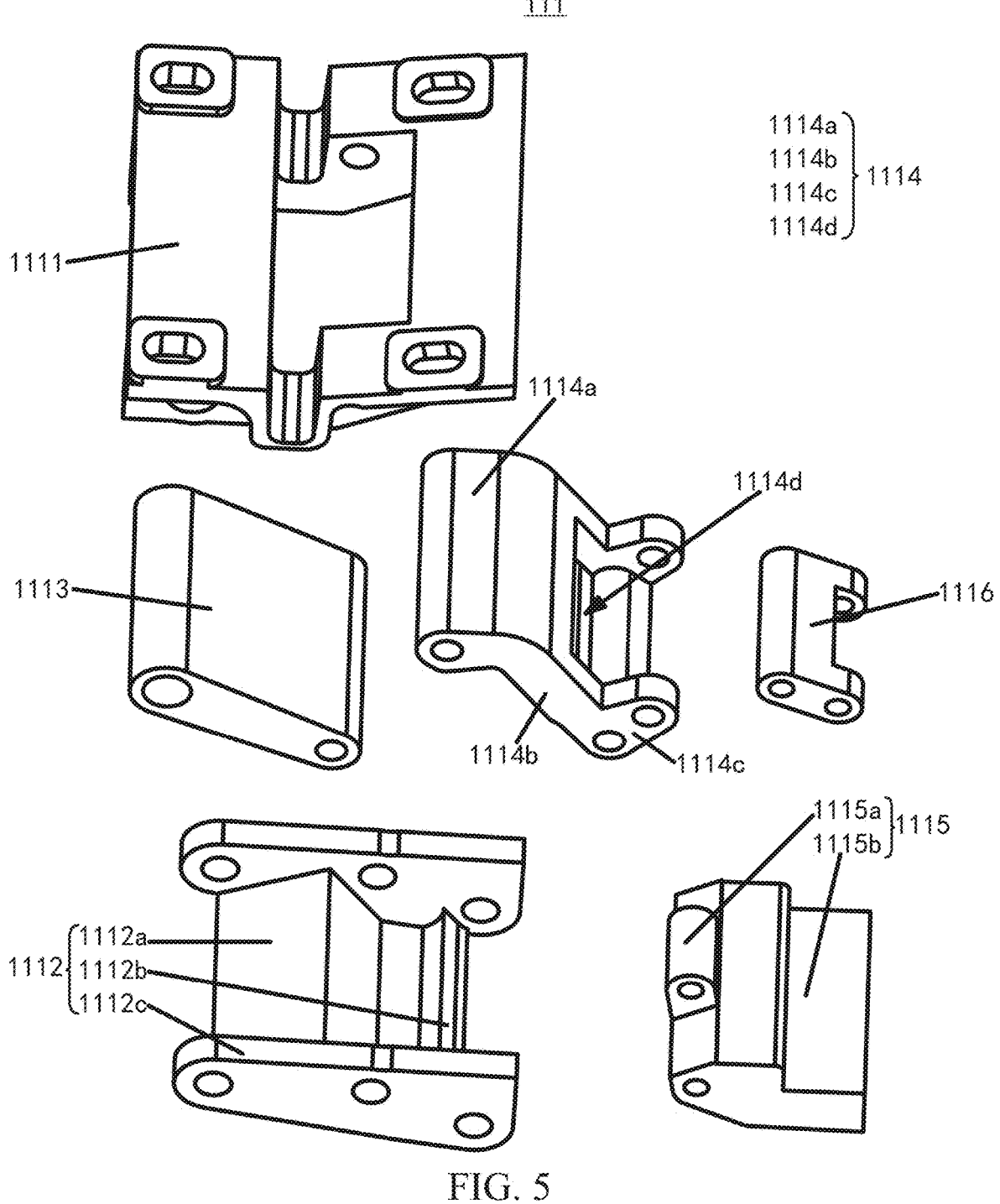
FIG. 5 is an exploded view of a connecting rod assembly according to some embodiments of the present disclosure.
Figure 6:
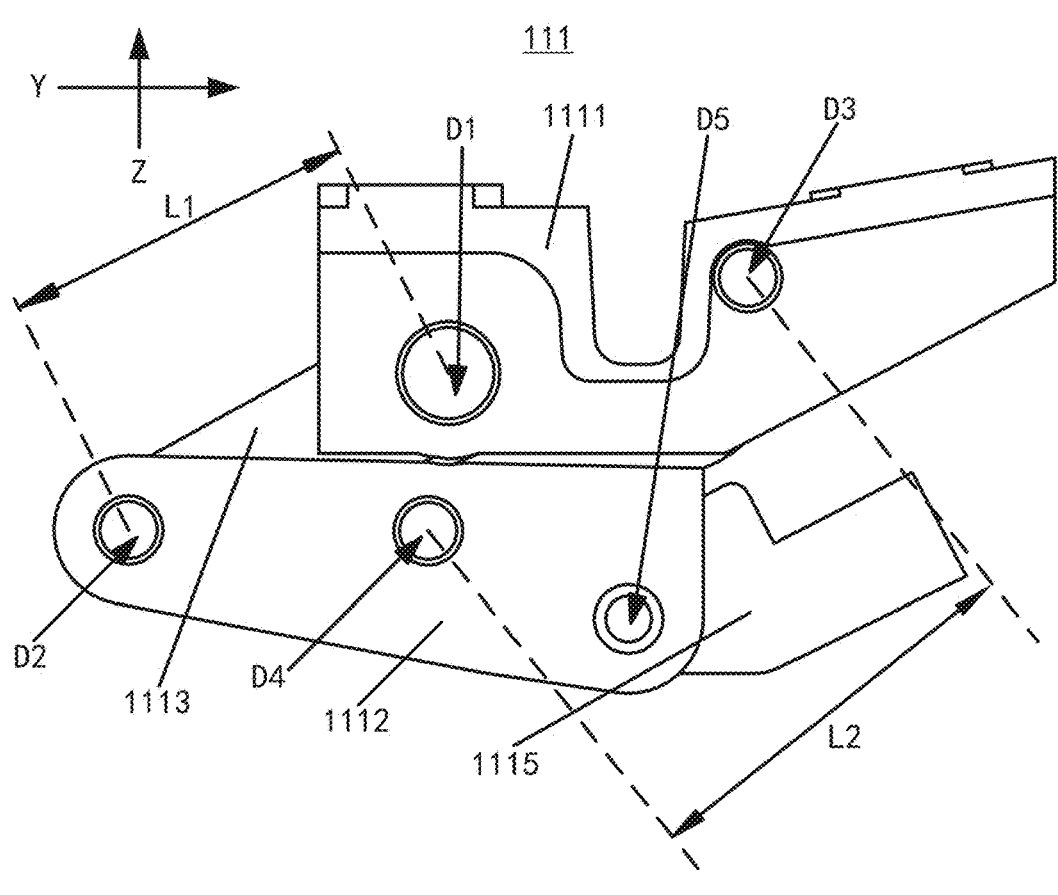
FIG. 6 is a structural schematic diagram of a connecting rod assembly in a retracted state according to some embodiments of the present disclosure.
Figure 7:
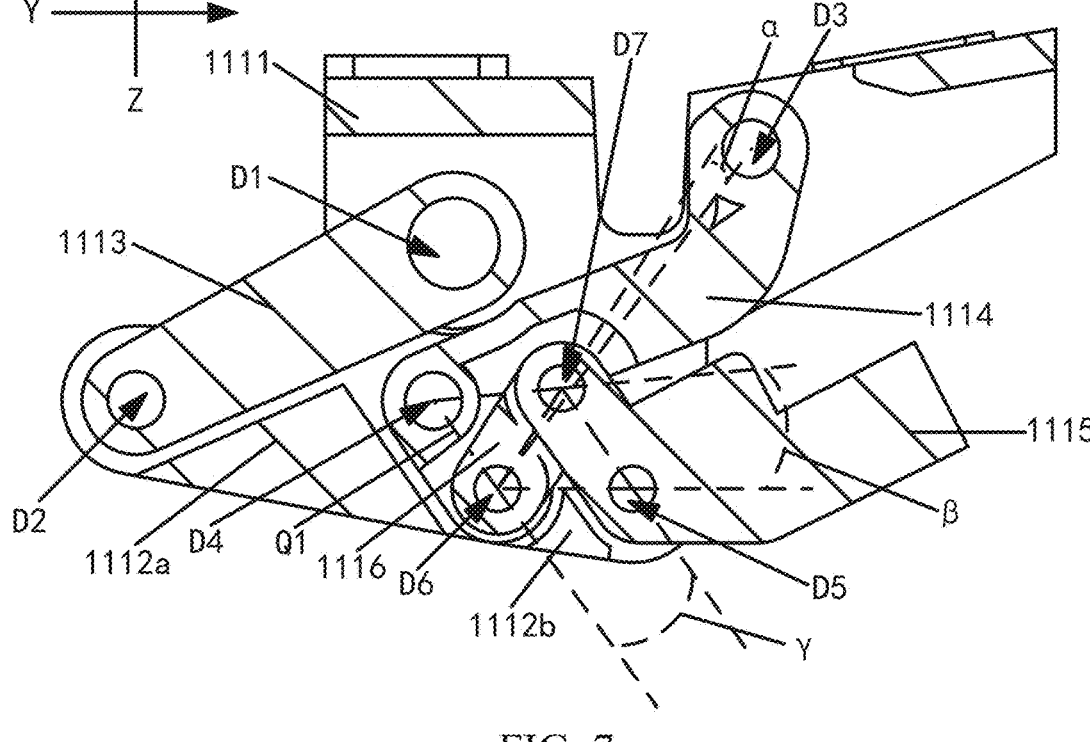
FIG. 7 is a cross-sectional view of a connecting rod assembly in a retracted state according to some embodiments of the present disclosure.
Figure 8:
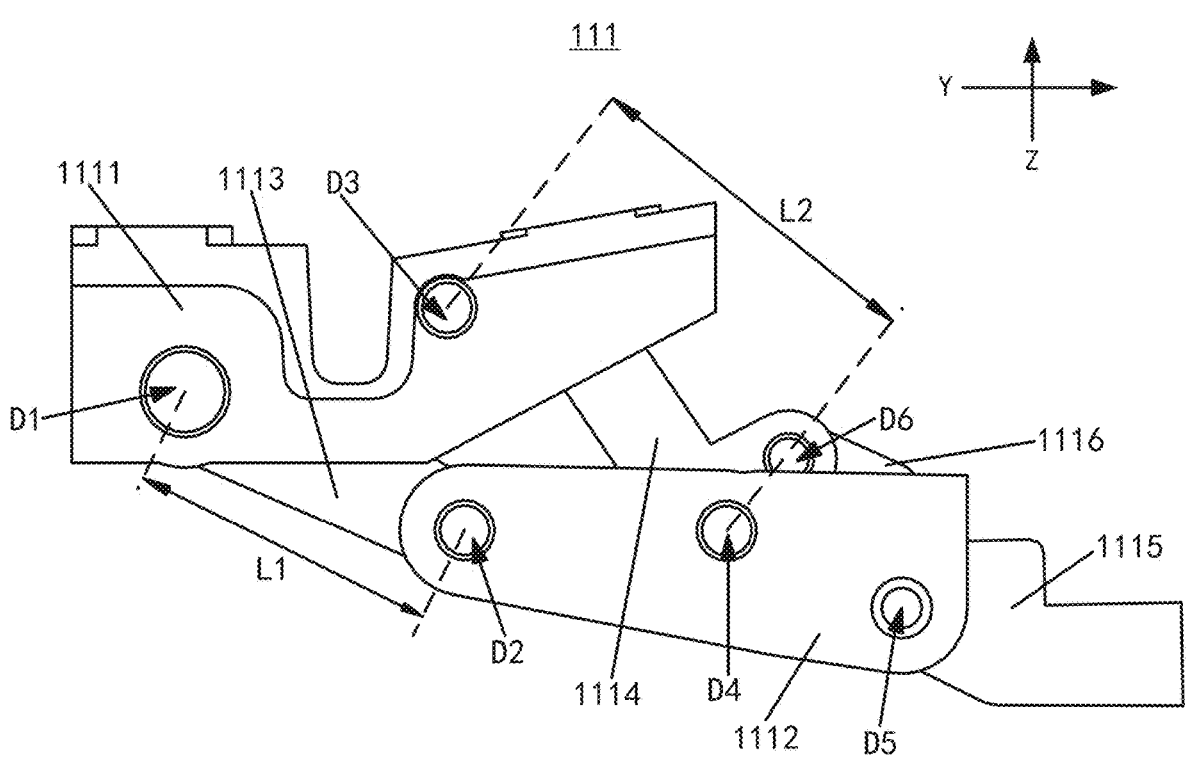
FIG. 8 is a structural schematic diagram of a connecting rod assembly in an extended state according to some embodiments of the present disclosure.
Figure 9:
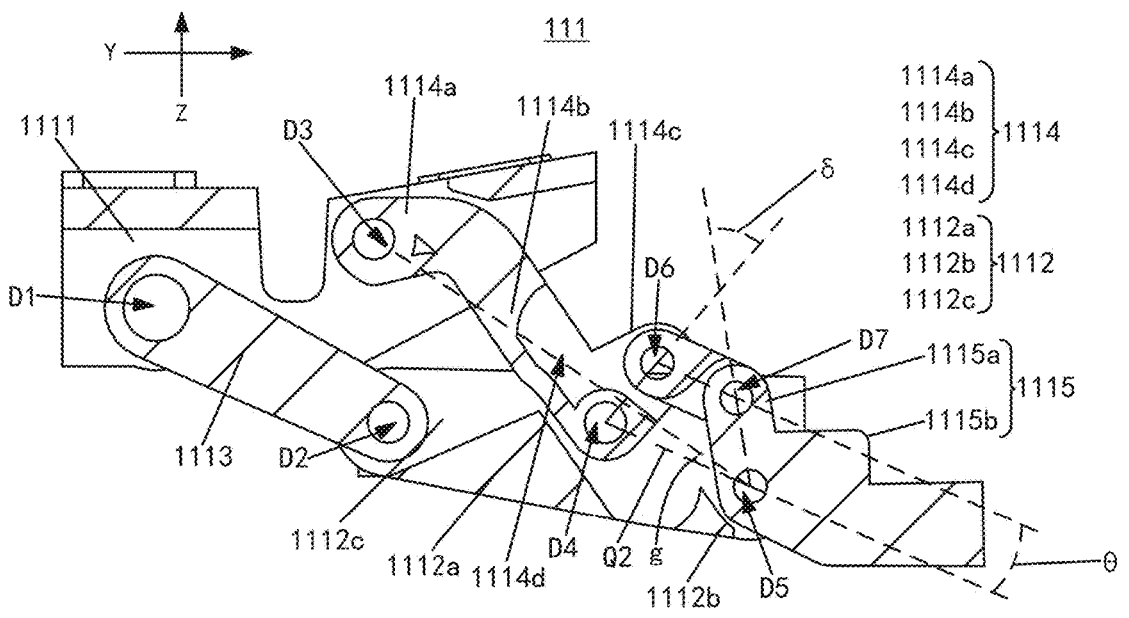
FIG. 9 is a cross-sectional view of a connecting rod assembly in an extended state according to some embodiments of the present disclosure.

FIG. 5 is an exploded view of a connecting rod assembly according to some embodiments of the present disclosure; FIG. 6 is a structural schematic diagram of a connecting rod assembly in a retracted state according to some embodiments of the present disclosure; FIG. 7 is a cross-sectional view of a connecting rod assembly in a retracted state according to some embodiments of the present disclosure; FIG. 8 is a structural schematic diagram of a connecting rod assembly in an extended state according to some embodiments of the present disclosure; FIG. 9 is a cross-sectional view of a connecting rod assembly in an extended state according to some embodiments of the present disclosure. Please refer to FIG. 1 to FIG. 9 in conjunction, the connecting rod assembly 111 provided in the present disclosure may include, but is not limited to, a mounting base 1111, a moving base 1112, a first swing arm 1113, a second swing arm 1114, a support arm 1115, and a linkage arm 1116. Specifically, the moving base 1112 is located below the mounting base 1111 along the first direction. In this embodiment, the first swing arm 1113 and the second swing arm 1114 can be attached to the chassis of the vehicle 100 by means of the mounting base 1111, so that the pedal apparatus 110 can be additionally mounted and used as a separately mountable accessory. In some other embodiments, the first swing arm 1113 and the second swing arm 1114 may be directly attached to the chassis of the vehicle 100. A first end of the first swing arm 1113 is hingedly connected to the mounting base 1111 at a first hinge point D1. A second end of the first swing arm 1113 is hingedly connected to the moving base 1112 at a second hinge point D2. A first end of the second swing arm 1114 is hingedly connected to the mounting base 1111 at a third hinge point D3. A second end of the second swing arm 1114 is hingedly connected to the moving base 1112 at a fourth hinge point D4. Along a second direction, at least one of the first swing arm 1113 and the second swing arm 1114 can drive the moving base 1112 to extend and retract relative to the mounting base 1111. The second direction is perpendicular to the first direction. In this embodiment, the first swing arm 1113 drives the moving base 1112 to extend and retract relative to the mounting base 1111. The support arm 1115 is hingedly connected to the moving base 1112 at a fifth hinge point D5. The fourth hinge point D4 is located between the fifth hinge point D5 and the second hinge point D2. A first end of the linkage arm 1116 is hingedly connected to a third end of the second swing arm 1114 at a sixth hinge point D6. A second end of the linkage arm 1116 is hingedly connected to the support arm 1115 at a seventh hinge point D7. In this way, the linkage arm 1116 can drive the support arm 1115 to flip around the fifth hinge point D5.

Specifically, along the second direction, the sixth hinge point D6 is farther away from the second hinge point D2 relative to the fourth hinge point D4, and the seventh hinge point D7 is more proximate to the second hinge point D2 relative to the fifth hinge point D5. Along the first direction, the seventh hinge point D7 is located above the fifth hinge point D5. Through such a layout, the support arm 1115 can be driven by the linkage arm 1116 to flip around the fifth hinge point D5 during the extension and retraction process of the moving base 1112. More specifically, in the process of extending the moving base 1112, the linkage arm 1116 drives the support arm 1115 to flip outward around the fifth hinge point D5; in the process of retracting the moving base 1112, the linkage arm 1116 drives the support arm 1115 to flip inward around the fifth hinge point D5.

Further, the angle at which the support arm 1115 can flip around the fifth hinge point D5 is greater than or equal to 20° and less than or equal to 35°, so that the pedal body 113 fits the vehicle skirt. Specifically, the angle at which the support arm 1115 can flip around the fifth hinge point D5 may be 20°, 25°, 30°, 35°, or the like. In this embodiment, the angle at which the support arm 1115 can flip around the fifth hinge point D5 is 26.3°.

Further, the distance between the first hinge point D1 and the second hinge point D2 is the first center distance L1. The distance between the third hinge point D3 and the fourth hinge point D4 is the second center distance L2. The first center distance L1 is smaller than the second center distance L2, so that less chassis space of the vehicle 100 is occupied when the first swing arm 1113 drives the moving base 1112 to be in a retracted state.

When the moving base 1112 is in an extended state or a retracted state, an included angle of 0° to 3° is allowed to be formed between a connecting line and a horizontal plane, and the connecting line is between the second hinge point D2 and the fourth hinge point D4. The difference between the second center distance L2 and the first center distance L1 is greater than or equal to 6 mm and less than or equal to 12 mm. In this way, the moving base 1112 has a certain swing amplitude and the arc-shaped trajectory of the swing is relatively smooth, so that the moving base 1112 can smoothly extend from the chassis without colliding with protrusions on the ground due to excessive swing amplitude.

Specifically, the pedal apparatus 110 is mounted on the chassis of the vehicle 100, and when the moving base 1112 is in an extended state or a retracted state, the included angle formed by the connecting line between the second hinge point D2 and the fourth hinge point D4 with the horizontal plane can be 0°, 0.2°, 0.3°, 0.45°, 0.66°, 1.24°, 1.51°, 2°, 2.4°, 2.62°, 3°, or the like.

Specifically, the difference between the second center distance L2 and the first center distance L1 may be 6 mm, 7 mm, 8 mm, 9 mm, 10 mm, 11 mm, 12 mm, or the like. In this embodiment, the difference between the second center distance L2 and the first center distance L1 is 9 mm.

Further, when the moving base 1112 is in a retracted state, the connecting line between the sixth hinge point D6 and the seventh hinge point D7 and the connecting line between the sixth hinge point D6 and the third hinge point D3 form a first included angle α. The first included angle α is an acute angle. The size of the first included angle α is greater than or equal to 0° and less than or equal to 10°. By arranging the sixth hinge point D6, the seventh hinge point D7 and the third hinge point D3 to be located on the same straight line or approximately on the same straight line, it is possible to prevent the base 1112 from extending automatically by the inertial load acting on the support arm 1115 moving during the driving of the vehicle 100 or prevent the inertial load acting on the support arm 1115 being transmitted to the driving device 112. In this way, the stability of the pedal apparatus 110 in the retracted state can be increased. For example, when the pedal apparatus 110 is subjected to external interference forces such as vibration or slight collision, the first included angle α can form a relatively stable force transmission relationship between the sixth hinge point D6, the seventh hinge point D7 and the third hinge point D3, so that the pedal apparatus 110 can better resist these external interferences and maintain a stable state.

Specifically, the size of the first included angle α may be 0°, 1.3°, 2.5°, 3.7°, 4.2°, 5°, 6.3°, 7.5°. 8.7°, 9.2°, 10°, or the like. In this embodiment, the size of the first included angle α is 4.19°.

Further, when the moving base 1112 is in a retracted state, the fourth hinge point D4, the seventh hinge point D7, the sixth hinge point D6 and the fifth hinge point D5 constitute four corner points of a first quadrilateral Q1. In the first quadrilateral Q1, the fourth hinge point D4 and the seventh hinge point D7 are located above the sixth hinge point D6 and the fifth hinge point D5 along the first direction, and the fourth hinge point D4 is diagonally opposite to the fifth hinge point D5. In the second direction, the fourth hinge point D4 is more proximate to the second hinge point D2 relative to the seventh hinge point D7. In this way, the connecting rod assembly 111 can be made more compact and reliable when it is in the retracted state, thereby reducing the occupied space and ensuring the concealment of the pedal apparatus 110 when retracted.

Further, when the moving base 1112 is in a retracted state, the connecting line between the fourth hinge point D4 and the seventh hinge point D7 and the connecting line between the sixth hinge point D6 and the fifth hinge point D5 form a second included angle β. The second included angle β is greater than or equal to 0° and less than or equal to 10°. Additionally or alternatively, when the moving base 1112 is in a retracted state, the connecting line between the fourth hinge point D4 and the sixth hinge point D6 and the connecting line between the seventh hinge point D7 and the fifth hinge point D5 form a third included angle γ, and the third included angle γ is greater than or equal to 0° and less than or equal to 5°. In this way, the connecting rod assembly 111 can be retracted compactly and reliably, and at the same time, the linkage arm 1116 can smoothly drive the support arm 1115 to flip outward when the connecting rod assembly 111 needs to be extended.

Specifically, the size of the second included angle β may be 0°, 0.7°, 1.3°, 2.5°, 3.8°, 4.2°, 5°, 5.7°, 6.3°, 7.5°, 8.8°, 9.2° and 10°, or the like. The size of the third included angle γ may be 0°. 0.3°, 0.7°. 1.2°, 2.5°, 3.1°, 3.7°, 4.3°, 4.6°, 5°, or the like. In this embodiment, the second included angle β is 5.58°, and the third included angle γ is 0.75°.

Further, when the moving base 1112 is in an extended state, the connecting line between the fifth hinge point D5 and the fourth hinge point D4 and the connecting line between the fifth hinge point D5 and the third hinge point D3 form a sixth included angle g. The sixth included angle g is an acute angle. The sixth included angle g is greater than or equal to 0° and less than or equal to 10°. By arranging the fifth hinge point D5, the fourth hinge point D4 and the third hinge point D3 to be located on the same straight line or approximately on the same straight line, it is possible to prevent the moving base 1112 being automatically retracted under the pedaling load acting on the support arm 1115, or prevent the pedaling load acting on the support arm 1115 transmitted to the driving device 112, when the pedal apparatus 110 is in an extended state.

Specifically, the sixth included angle g may be 0°. 1.3°, 2.5°, 3.7°, 4.2°, 5°, 6.3°, 7.5°, 8.7°, 9.2° and 10°, or the like. In this embodiment, the sixth included angle g is 9.57°.

Further, when the moving base 1112 is in an extended state, the sixth hinge point D6, the seventh hinge point D7, the fourth hinge point D4 and the fifth hinge point D5 constitute four corner points of a second quadrilateral Q2. In the second quadrilateral Q2, the sixth hinge point D6 and the seventh hinge point D7 are located above the fourth hinge point D4 and the fifth hinge point D5 along the first direction, and the sixth hinge point D6 is diagonally opposite to the fifth hinge point D5. In the second direction, the sixth hinge point D6 is more proximate to the second hinge point D2 relative to the seventh hinge point D7. In this way, the connecting rod assembly 111 can be extended appropriately in the extended state, thereby increasing the extended length and ensuring that the driver and passengers have sufficient footholds.

Further, when the moving base 1112 is in an extended state, the connecting line between the sixth hinge point D6 and the seventh hinge point D7 and the connecting line between the fourth hinge point D4 and the fifth hinge point D5 form a fourth included angle θ. The fourth included angle θ is greater than or equal to 0° and less than or equal to 5°. Additionally or alternatively, when the moving base 1112 is in an extended state, the connecting line between the sixth hinge point D6 and the fourth hinge point D4 and the connecting line between the seventh hinge point D7 and the fifth hinge point D5 form a fifth included angle δ. The fifth included angle δ is greater than or equal to 45° and less than or equal to 55°. In this way, the connecting rod assembly 111 can be extended to a position appropriately, and at the same time it can smoothly drive the support arm 1115 to flip inward by means of the linkage arm 1116 in case of retraction.

Specifically, the size of the fourth included angle θ may be 0°, 0.3°, 0.7°, 1.2°, 2.5°, 3.1°, 3.7°, 4.3°, 4.6° and 5°, or the like. The size of the fifth included angle & may be 45°, 45.3°, 45.7°, 46.2°, 47.5°, 48.1°, 48.7°, 49.3°, 49.6° and 55°, or the like. In this embodiment, the size of the fourth included angle θ is 0.27°, and the size of the fifth included angle δ is 49.92°.

In this embodiment, the second swing arm 1114 is in a Z-shape as a whole. The second swing arm 1114 may include, but is not limited to, a first connecting portion 1114a, a main body portion 1114b and a second connecting portion 1114c. Specifically, the main body portion 1114b is connected between the first connecting portion 1114a and the second connecting portion 1114c. A first end of the first connecting portion 1114a opposite the main body portion 1114b is hingedly connected to the mounting base 1111 at a third hinge point D3. A first end of the main body portion 1114b opposite the first connecting portion 1114a is hingedly connected to the moving base 1112 at a fourth hinge point D4. A first end of the second connecting portion 1114c opposite the main body portion 1114b is hingedly connected to the linkage arm 1116 at a sixth hinge point D6.

Further, the second swing arm 1114 defines a receiving groove 1114d. When the moving base 1112 is in a retracted state, the linkage arm 1116 is received in the receiving groove 1114d. In this way, the space can be effectively utilized, and the volume of the pedal apparatus 110 can be reduced when the moving base 1112 is in a retracted state, thereby ensuring the retraction concealment of the pedal apparatus 110.

In this embodiment, the support arm 1115 is in an L-shape as a whole. The support arm 1115 may include, but is not limited to, a third connecting portion 1115a and a supporting portion 1115b connected to each other. A first end of the third connecting portion 1115a opposite the supporting portion 1115b is hingedly connected to the linkage arm 1116 at a seventh hinge point D7, and a second end of the third connecting portion 1115a proximate to the supporting por- tion 1115b is hingedly connected to the moving base 1112 at a fifth hinge point D5.

In this embodiment, the moving base 1112 may include, but is not limited to, a first molded base plate 1112a, a second molded base plate 1112b and side plates 1112c. The first molded base plate 1112a and the second molded base plate 1112b are arranged between the two side plates 1112c at intervals. A first end of the side plates 1112c is hingedly connected to the first swing arm 1113 at a second hinge point D2. A second end of the side plates 1112c is hingedly connected to the support arm 1115 at a fifth hinge point. The structure between the two ends of the side plates 1112c is hingedly connected to the second swing arm 1114 at a fourth hinge point D4. The space enclosed by the side plates 1112*c*, the first molded base plate 1112*a* and the second molded base plate 1112*b* can accommodate part of the structure of the first swing arm 1113, part of the structure of the support arm 1115 and part of the structure of the second swing arm 1114. In this way, the relative positional relationship between the components is closer, thereby reducing the volume of the pedal apparatus 110 in the retracted state and improving the space utilization. Meanwhile, the impacts of foreign objects such as dust, accumulated water, and flying stones on the first swing arm 1113, the second swing arm 1114, the support arm 1115, and the linkage arm 1116 during the driving of the vehicle 100 can be effectively reduced, and the service life of the pedal apparatus 110 is increased.

The connecting rod assembly 111 provided in the present disclosure includes: a mounting base 1111; a moving base 1112, the moving base 1112 being located below the mounting base 1111 along a first direction; a first swing arm 1113, a first end of the first swing arm 1113 being hingedly connected to the mounting base 1111 at a first hinge point D1, and a second end of the first swing arm 1113 being hingedly connected to the moving base 1112 at a second hinge point D2; a second swing arm 1114, a first end of the second swing arm 1114 being hingedly connected to the mounting base 1111 at a third hinge point D3, and a second swing arm 1114 being hingedly connected to the moving base 1112 at a fourth hinge point D4, where at least one of the first swing arm 1113 and the second swing arm 1114 can drive the moving base 1112 to extend and retract relative to the mounting base 1111 along the second direction; a support arm 1115, the support arm 1115 being hingedly connected to the moving base 1112 at a fifth hinge point D5, and the fourth hinge point D4 being located between the fifth hinge point D5 and the second hinge point D2; and a linkage arm 1116, a first end of the linkage arm 1116 being hingedly connected to a third end of the second swing arm 1114 at a sixth hinge point D6, and a second end of the linkage arm 1116 being hingedly connected to the support arm 1115 at a seventh hinge point D7, where the linkage arm 1116 can drive the support arm 1115 to flip around the fifth hinge point D5. According to the technical solutions of the present disclosure, when the moving base 1112 is extending relative to the mounting base 1111, the support arm 1115 flips outwards as the moving base 1112 is extended, so that the pedal body 113 fixed to the support arm 1115 has a sufficient extension length; when the moving base 1112 is retracting relative to the mounting base 1111, the support arm 1115 flips inward as the moving base 1112 is retracted, so that the pedal body 113 fixed to the support arm 1115 can fit the vehicle skirt. In this way, the connecting rod assembly 111 can enable the pedal apparatus 110 mounted on the new energy vehicle to have a sufficient extension length while ensuring the retraction concealment.

The foregoing description merely describes some embodiments of the present disclosure, and is not intended to limit the protection scope of the present disclosure. Any equivalent device or equivalent process transformation made according to the contents of the description and drawings of the present disclosure or used in other related technical fields directly or indirectly shall also fall within the protection scope of the present disclosure.

What is claimed is:

1. A connecting rod assembly, comprising:

a mounting base;

a moving base, the moving base being located below the mounting base along a first direction;

a first swing arm, a first end of the first swing arm being hingedly connected to the mounting base at a first hinge point, and a second end of the first swing arm being hingedly connected to the moving base at a second hinge point;

a second swing arm, a first end of the second swing arm being hingedly connected to the mounting base at a third hinge point, and a second end of the second swing arm being hingedly connected to the moving base at a fourth hinge point;

at least one of the first swing arm and the second swing arm being capable of driving the moving base to extend and retract relative to the mounting base along a second direction;

a support arm, the support arm being hingedly connected to the moving base at a fifth hinge point, and the fourth hinge point being located between the fifth hinge point and the second hinge point; and a linkage arm, a first end of the linkage arm being hingedly connected to a third end of the second swing arm at a sixth hinge point, and a second end of the linkage arm being hingedly connected to the support arm at a seventh hinge point;

wherein the linkage arm is capable of driving the support arm to flip around the fifth hinge point.

2. The connecting rod assembly according to claim 1, wherein a distance between the first hinge point and the second hinge point is a first center distance, a distance between the third hinge point and the fourth hinge point is a second center distance, and the first center distance is smaller than the second center distance; and when the moving base is in an extended state or a retracted state, an included angle of 0° to 3° is allowed to be formed between a connecting line and a horizontal plane, and the connecting line is between the second hinge point and the fourth hinge point.

3. The connecting rod assembly according to claim 2, wherein a difference between the second center distance and the first center distance is greater than or equal to 6 mm and less than or equal to 12 mm.

4. The connecting rod assembly according to claim 1, wherein the sixth hinge point is farther away from the second hinge point relative to the fourth hinge point and the seventh hinge point is more proximate to the second hinge point relative to the fifth hinge point along the second direction, and the seventh hinge point is located above the fifth hinge point along the first direction.

5. The connecting rod assembly according to claim 4, wherein when the moving base is in a retracted state, a connecting line between the sixth hinge point and the seventh hinge point and a connecting line between the sixth hinge point and the third hinge point form a first included angle, the first included angle is an acute angle, and the size of the first included angle is greater than or equal to 0° and less than or equal to 10°.

6. The connecting rod assembly according to claim 4, wherein when the moving base is in a retracted state, the fourth hinge point, the seventh hinge point, the sixth hinge point and the fifth hinge point constitute four corner points of a first quadrilateral, and wherein in the first quadrilateral, the fourth hinge point and the seventh hinge point are located above the sixth hinge point and the fifth hinge point along the first direction, and the fourth hinge point is diagonally opposite to the fifth hinge point, and in the second direction, the fourth hinge point is more proximate to the second hinge point relative to the seventh hinge point.

7. The connecting rod assembly according to claim 6, wherein the fourth hinge point, the seventh hinge point, the sixth hinge point and the fifth hinge point are arranged in at least one of the following configurations:

when the moving base is in a retracted state, a connecting line between the fourth hinge point and the seventh hinge point and a connecting line between the sixth hinge point and the fifth hinge point form a second included angle, and the size of the second included angle is greater than or equal to 0° and less than or equal to 10°; and, when the moving base is in a retracted state, a connecting line between the fourth hinge point and the sixth hinge point and a connecting line between the seventh hinge point and the fifth hinge point form a third included angle, and the size of the third included angle is greater than or equal to 0° and less than or equal to 5°.

8. The connecting rod assembly according to claim 4, wherein when the moving base is in an extended state, the sixth hinge point, the seventh hinge point, the fourth hinge point, and the fifth hinge point constitute four corner points of a second quadrilateral:

in the second quadrilateral, the sixth hinge point and the seventh hinge point are located above the fourth hinge point and the fifth hinge point along the first direction, and the sixth hinge point is diagonally opposite to the fifth hinge point, and in the second direction, the sixth hinge point is more proximate to the second hinge point relative to the seventh hinge point.

9. The connecting rod assembly according to claim 8, wherein the fourth hinge point, the seventh hinge point, the sixth hinge point and the fifth hinge point are arranged in at least one of the following configurations:

when the moving base is in an extended state, a connecting line between the sixth hinge point and the seventh hinge point and a connecting line between the fourth hinge point and the fifth hinge point form a fourth included angle, and the size of the fourth included angle is greater than or equal to 0° and less than or equal to 5°; and, when the moving base is in an extended state, a connecting line between the sixth hinge point and the fourth hinge point and a connecting line between the seventh hinge point and the fifth hinge point form a fifth included angle, and the size of the fifth included angle is greater than or equal to 45° and less than or equal to 55°.

10. The connecting rod assembly according to claim 4, wherein the second swing arm comprises a first connecting portion, a main body portion and a second connecting portion, the main body portion is connected between the first connecting portion and the second connecting portion, a first end of the first connecting portion opposite the main body portion is hingedly connected to the mounting base at the third hinge point, a first end of the main body portion opposite the first connecting portion is hingedly connected to the moving base at the fourth hinge point, and a first end of the second connecting portion opposite the main body portion is hingedly connected to the linkage arm at the sixth hinge point.

11. The connecting rod assembly according to claim 4, wherein the second swing arm defines a receiving groove, and the linkage arm is configured to be received in the receiving groove when the moving base is in a retracted state.

12. The connecting rod assembly according to claim 4, wherein the support arm comprises a third connecting portion and a supporting portion connected to each other, a first end of the third connecting portion opposite the supporting portion is hingedly connected to the linkage arm at the seventh hinge point, and a second end of the third connecting portion proximate to the supporting portion is hingedly connected to the moving base at the fifth hinge point.

13. The connecting rod assembly according to claim 4, wherein the moving base comprises a first molded base plate, a second molded base plate and two side plates, the first molded base plate and the second molded base plate are arranged between the two side plates at intervals, the two side plates are hingedly connected at one of their respective ends to the first swing arm at the second hinge point, are hingedly connected at the other of their respective ends to the support arm at the fifth hinge point, a structure between the two ends of the two side plates is hingedly connected to the second swing arm at the fourth hinge point, and a space enclosed by the two side plates, the first molded base plate and the second molded base plate-are capable of accommodating part of the first swing arm, part of the support arm and part of the second swing arm.

14. The connecting rod assembly according to claim 4, wherein when the moving base is in an extended state, a connecting line between the fifth hinge point and the fourth hinge point and a connecting line between the fifth hinge point and the third hinge point form a sixth included angle, the sixth included angle is an acute angle, and the sixth included angle is greater than or equal to 0° and less than or equal to 10°.

15. The connecting rod assembly according to claim 1, wherein the second swing arm is in a Z-shape as a whole, and the support arm is in an L-shape as a whole.

16. The connecting rod assembly according to claim 1, wherein the support arm is capable of flipping around the fifth hinge point at an angle greater than or equal to 20° and less than or equal to 35°.

17. A pedal apparatus, comprising:

a connecting rod assembly;

a driving device configured to drive at least one of a first swing arm and a second swing arm of the connecting rod assembly; and a pedal body fixed to a support arm of the connecting rod assembly;

wherein, the pedal body is extended and flipped relative to a mounting base of the connecting rod assembly when being driven by the driving device; and wherein the connecting rod assembly is the connecting rod assembly according to claim 1.

18. The pedal apparatus according to claim 17, wherein the pedal apparatus comprises a plurality of connecting rod assemblies, the connecting rod assembly is one of the plurality of connecting rod assemblies, and the plurality of connecting rod assemblies are arranged along a length direction of the pedal body.

19. The pedal apparatus according to claim 17, wherein when the mounting base is fixed to a chassis of a vehicle, an included angle between a pedal surface of the pedal body and an horizontal plane is greater than or equal to 0° and less than or equal to 5° when the moving base of the connecting rod assembly is in an extended state, and the included angle between the pedal surface of the pedal body and the horizontal plane is greater than or equal to 20° and less than or equal to 40° when the moving base of the connecting rod assembly is in a retracted state.

20. A vehicle, comprising the pedal apparatus according to claim 17, wherein a mounting base in the pedal apparatus is fixed to a chassis of the vehicle, and when a moving base in the pedal apparatus is in an extended state, a first gap distance exists between a pedal body in the pedal apparatus and a side skirt of the vehicle along a first direction, and a second gap distance exists between the pedal body in the pedal apparatus and the side skirt of the vehicle along a second direction; and the pedal body is configured to fit the side skirt of the vehicle when the moving base in the pedal apparatus is in a retracted state.

\* \* \* \* \*